US008122453B2

(12) United States Patent
Trossman et al.

(10) Patent No.: US 8,122,453 B2
(45) Date of Patent: *Feb. 21, 2012

(54) METHOD AND SYSTEM FOR MANAGING RESOURCES IN A DATA CENTER

(75) Inventors: Andrew Trossman, Toronto (CA); Gabriel Iszlai, Toronto (CA); Mircea Mihaescu, Richmond Hill (CA); Michael Scarth, Toronto (CA); Paul D. Vytas, Toronto (CA); Michael Li, Richmond Hill (CA); Duncan Hill, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 1112 days.

This patent is subject to a terminal disclaimer.

(21) Appl. No.: 11/950,286

(22) Filed: Dec. 4, 2007

(65) Prior Publication Data

US 2008/0086731 A1    Apr. 10, 2008

Related U.S. Application Data

(62) Division of application No. 10/357,352, filed on Feb. 4, 2003, now Pat. No. 7,308,687.

(51) Int. Cl.
*G06F 9/46* (2006.01)
*G06F 15/18* (2006.01)

(52) U.S. Cl. ............... 718/104; 718/106; 706/14

(58) Field of Classification Search ............ 718/104, 718/106; 706/14
See application file for complete search history.

(56) References Cited

U.S. PATENT DOCUMENTS 5,212,791 A    5/1993 Damian et al.
5,826,083 A    10/1998 Prasad
6,487,578 B2    11/2002 Ranganathan
6,546,364 B1    4/2003 Smirnov et al.
6,678,667 B1    1/2004 Ammon
6,895,573 B2    5/2005 Norgaard et al.
6,957,206 B2    10/2005 Nolan
7,103,597 B2    9/2006 McGoveran
2002/0156612 A1    10/2002 Schulter et al.
2002/0156613 A1    10/2002 Geng et al.
2004/0103185 A1    5/2004 Combs

FOREIGN PATENT DOCUMENTS

EP    1061710 A2    12/2000
WO    0106415 A1    1/2001
WO    0117169 A1    3/2001
WO    02086712 A1    10/2002

OTHER PUBLICATIONS

Sheth, "From Contemporary Workflow Process Automation to Adaptive and Dynamic Work Activity Coordination and Collaboration", IEEE 1997, pp. 24-27.

*Primary Examiner* — Li Zhen
*Assistant Examiner* — Bradford Wheaton
(74) *Attorney, Agent, or Firm* — Yee & Associates, P.C.; Jeffrey S. LaBaw

(57) ABSTRACT

The present invention provides dynamic configuration and allocation of resources in a data center. These resources are monitored for availability and performance information according to their assigned execution (or application) environments. The measured performance information for each environment is used to predict levels of demand for an application in the environment. From the predicted levels of demand resource requirements can be determined to provide a predetermined level of performance under the demand changes. The resources can then be reconfigured or reallocated to different environment so that the requirements of each environment can be met.

18 Claims, 8 Drawing Sheets

METHOD AND SYSTEM FOR MANAGING RESOURCES IN A DATA CENTER

CROSS REFERENCE TO RELATED APPLICATIONS

This application is a divisional of application Ser. No. 10/357,352, filed Feb. 4, 2003, and issued as U.S. Pat. No. 7,308,687 on Dec. 11, 2007.

FIELD OF THE INVENTION

The present invention is directed towards management of resources in a data center, and more particularly to dynamic management of such resources.

BACKGROUND OF THE INVENTION

The increased use of information, and technology to organize and take advantage of that information, has led to an increase in the demand on data centers. As a result data centers have encountered problems with managing resources and providing appropriate levels of service for hosted applications.

Data centers host business applications according to expected execution service levels, taking into consideration factors such as operational responsiveness and application performance, availability and security. These expectations are often satisfied via isolation and over-provisioning in the data center.

Isolation involves the separation of unrelated applications from each other by allocating each application with its associated execution environment of dedicated network and server infrastructure to ensure that high application demand, faults and security breaches do not adversely affect the performance, availability and security of another application. Over-provisioning involves an over supply of server power to meet anticipated peak application demand. This provides an insurance against poor response times in the event that an application encounters unexpected demand. When isolation is used and each application is over-provisioned within each isolated application environment there is a resulting trapped capacity that can't be used by other applications during times of high demand. The use of isolation and over-provisioning to meet expected service levels results in a low aggregated resource utilization and optimization.

SUMMARY OF THE INVENTION

In accordance with an aspect of the present invention there is provided a method of managing an application environment having an operating state according to an operating objective, the application environment having a computing resource with a characteristic representative of an operating state of the computing resource, said method comprising: (a) determining a future operating state of the application environment based on a current status of the characteristic of the computing resource; (b) determining a difference between the future operating state of the application environment and the operating objective; (c) generating a selected set of changes to the application environment for reducing the difference; and (d) repeating steps (a) to (c) to monitor the future operating state of the application environment.

In accordance with another aspect of the present invention there is provided a method of managing a plurality of application environments according to an operating objective for each of the plurality of application environments, each of the plurality of application environments having an operating state and being assigned a computing resource from a plurality of computing resources, each of the plurality of computing resources having a characteristic representative of an operating state of the computing resource, said method comprising: (a) estimating a future time-varying status of the characteristic of the assigned computing resource for the specific application environment based on a time-varying component of the current status; (b) estimating a future time stationary status of the characteristic of the assigned computing resource for the specific application environment based on a time stationary component of the current status; (c) combining the future time-varying status and the future time stationary status to form a future status of the characteristic of the assigned computing resource for specific application environment; (d) determining a response of the specific application environment to the future status of the characteristic of the assigned computing resource for the specific application environment, wherein the future operating state of the specific application environment is based on the response; (e) determining a difference between the future operating state of the specific application environment and the operating objective for the specific application environment; (f) creating a plurality of sets of changes to the specific application environment, each of the plurality of sets of changes resulting in a reduction of the difference; (g) assessing each of the plurality of sets of changes to determine a quantitative preference for the effect on the future operating state of the specific application environment of each of the plurality of sets of changes based a property of the effect; (h) determining the selected set of changes from the plurality of sets of changes based on the quantitative preference; (i) effecting the selected set of changes on the selected application environment; and (j) repeating steps (a) to (i) for each of the plurality of application environments to monitor the future operating state of each of the plurality of application environments.

In accordance with a further aspect of the present invention there is provided a closed-loop system for managing an application environment having an operating state according to an operating objective, the application environment having a computing resource with a characteristics representative of an operating state of the computing resource, said system comprising: a state determination mechanism for determining a difference between the operating objective and a future operating state of the application environment based on a current status of the characteristic of the computing resource; a resource change mechanism for creating a selected set of changes to the application environment to reduce of the difference; and a deployment mechanism for effecting the selected set of changes on the application environment.

In accordance with yet another aspect of the present invention there is provided a computer readable medium having stored thereon computer-executable instructions for managing an application environment having an operating state according to an operating objective, the application environment having a computing resource with a characteristic representative of an operating state of the computing resource, the computer-executable instructions comprising: (a) determining a future operating state of the application environment based on a current status of the characteristic of the computing resource; (b) determining a difference between the future operating state of the application environment and the operating objective; (c) generating a selected set of changes to the application environment for reducing the difference; and (d)

repeating steps (a) to (c) to monitor the future operating state of the application environment.

BRIEF DESCRIPTION OF THE DRAWINGS

The present invention will be described in conjunction with the drawings in which.

DETAILED DESCRIPTION

Figure 1:
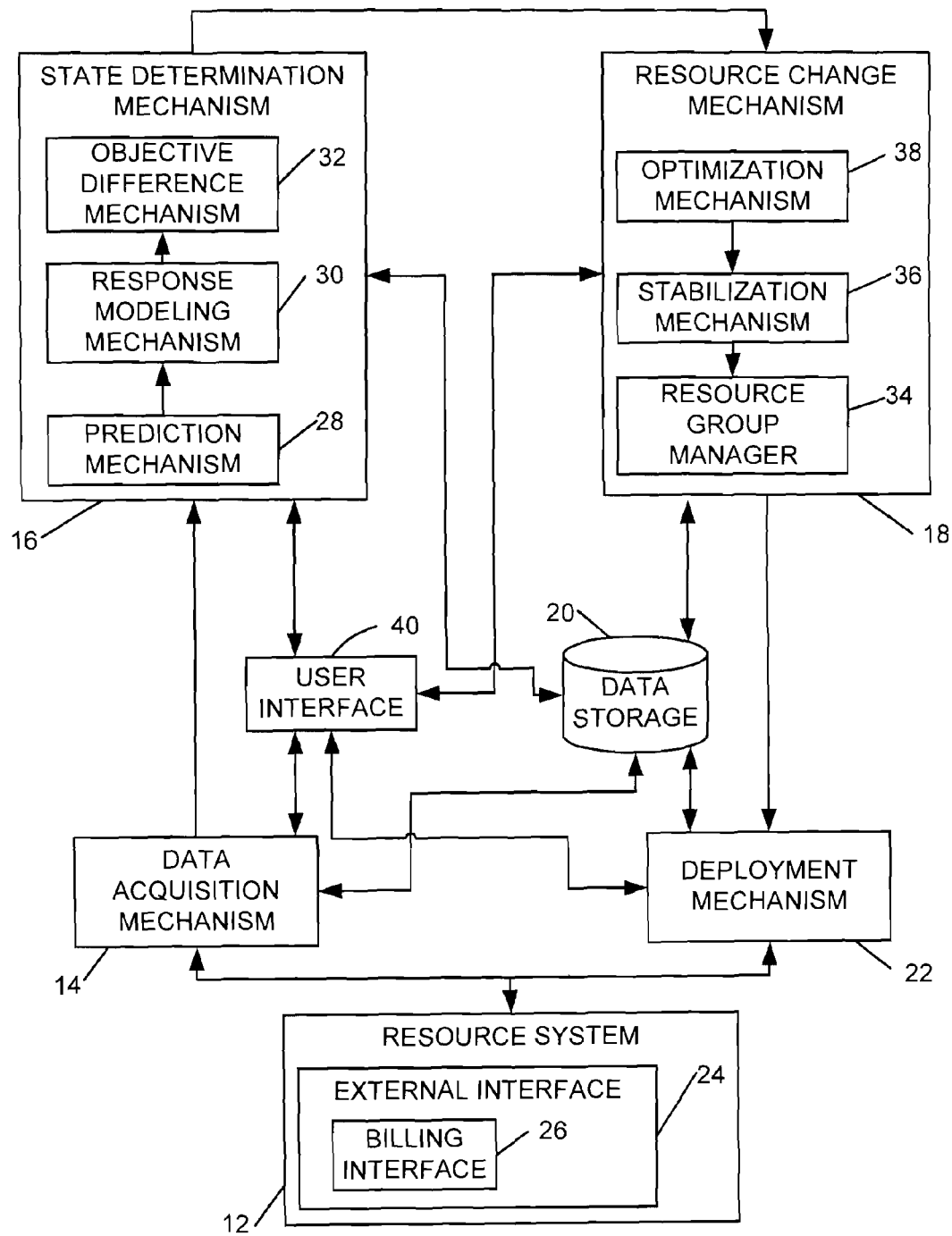
FIG. 1 is a system diagram of a management system according to an embodiment of the present invention.

FIG. 1 is a system diagram of a closed-loop management system 10 for proactively managing computing resources in a resource system 12, such as a data center, with a variety of possibly conflicting criteria. The management system 10 proactively configures computing resources in the resource system 12 among multiple applications placing demand on these resources. The proactive configuration of the computing resources in the resource system 12 balances demand for computing resources, reconfigures excess computing resources and maintains predetermined levels of service for each application. The management system 10 continues to monitor the computing resources after changes in the configuration have been enacted to manage the computing resources in a closed-loop manner.

Resources managed by the management system 10 may be any resource used for the execution of an application including servers, routers, software licenses, etc. Each resource in the resource system 12 may be classified according to a resource type (e.g. server, software license, etc.). Each resource has an operating state that represents the performance of the resource and a status of characteristics of the resource, such as the amount of demand on the resource.

Each application that is managed by the management system 10 is part of an application environment containing an application and all resources used for the execution of the application. Overall control of the application environment is performed by the management system 10. Management of an application environment takes into consideration a future state of the application environment including future demand and the response to this demand. Each application environment may have an operating objective, such as a predetermined level of service, that is to be met. This operating objective may be based on a service level agreement of that application environment or by importance of the application environment in relation to other application environments. Each application environment has an application layer, an operating system layer, a resource infrastructure layer and a networking infrastructure layer.

The networking infrastructure layer contains the connections between different resources in the resource infrastructure layer of the application environment and resources outside the application environment. The networking infrastructure layer provides a description of how application environments are interconnected. The networking infrastructure layer may include components such as switches, routers, load balancers and firewalls.

The resource infrastructure layer contains the physical resources in the application environment on which the application layer and operating system layer function. The resource infrastructure layer contains those resources that are allocated to the current application environment. The resource infrastructure layer may include components such as servers and other computing resources.

The operating system layer provides a base level of operation for the resource infrastructure layer. The operating system layer acts as an intermediary between the application layer and the resource infrastructure layer to assist in accomplishing the desired functions of the application layer. The operating system layer may be based on a known operating system such as Microsoft Windows™, Unix, Linux, etc.

The application layer contains the application being hosted by the resource system 12 and managed by the management system 10. The application layer contains the functionality to be offered by the application environment. The application layer may be one of types web, application or database. The web type application may process incoming requests for other applications in other application environments. The application type application may provide business transaction functionality. The database type application may act as an interface with a database managing information via creating, reading, updating, removing, etc.

Application environments may be created by system administrators of the management system 10 and the resource system 12 via a user interface 40 in communication with all components of the management system 10. Alternatively, an application environment may be automatically created by a deployment mechanism 22 in communication with the resource system 12.

A data acquisition mechanism 14 and the deployment mechanism 22 interface directly with the resource system 12. The data acquisition mechanism 14 obtains the current state of the resources in the resource system 12 including performance and demand information for the resource. The data acquisition mechanism 14 stores this information in a data storage 20. The data storage 20 stores information on the resources in the resource system 12 such as a resource identifier and current configuration information as well as performance and demand information. The data storage 20 is in communication with the data acquisition mechanism 14, the deployment mechanism 22, a state determination mechanism 16 and a resource change mechanism 18 for dissemination of the current state information.

The data acquisition mechanism 14 is in communication with the state determination mechanism 16 for provision of the current state information from the resource system 12. The state determination mechanism 16 is responsible for the performance maintenance of each application environment managed by the management system 10. A separate state determination mechanism 16 may be used for each application environment. The state determination mechanism 16 contains a prediction mechanism 28, a response modeling mechanism 30 and a objective difference mechanism 32, all of which work together to predict future demand levels for the application environment. The predicted future demand levels are then used to determine resource requirements for the application environment if the operating objective for the application environment is to be maintained.

The state determination mechanism 16 provides the resource change mechanism 18 with the resource requirements for the application environment given changes in the current state. The resource change mechanism 18 receives resource requirements from each separate state determination mechanism 16 and balances these requests against each other. The resource change mechanism 18 contains an optimization mechanism 38, a stabilization mechanism 36 and a resource group manager 34, all of which function together to determine the configuration and allocation for each resource in the resource system 12. Given the differing resource requirements for each application environment using and requiring resources in the resource system 12, the resource change mechanism 18 decides where the resources will be allocated.

The resource reconfiguration and allocation information determined by the resource change mechanism 18 is passed to the deployment mechanism 22. The deployment mechanism 22 breaks down the changes in configuration for each resource down into commands that can be formatted and sent to the resources in the resource system 12 for implementation of the changes.

The user interface 40 is in communication with the data storage 20 to allow user access to and manipulation of the information contained therein. The user interface 40 is also in communication with the data acquisition mechanism 14, the deployment mechanism 22, the state determination mechanism 16 and the resource change mechanism 18. The user interface 40 provides a view of the state of all physical and logical resources in the resource system 12. In this manner a user can access information about the resources and their allocation as well as allow for user generated configurations and allocations. The user interface 40 may also be used to create application environments.

Resource System

The resource system 12 contains computing resources that are configured and managed by the management system 10. The resource system 12 contains the resources from the resource infrastructure layer and the networking infrastructure layer of the application environment.

The resource infrastructure layer resources in the resource system 12 may include computing resources such as any computing unit with a central processing unit (CPU) and memory. A computing unit may be an entire computer or a section of a computer.

Computing resources of one type in the resource system 12 are segmented into groups that may be managed as a single entity. Those computing resource groups that are not allocated may be allocated together to an application environment. The resource groups of one resource type, may be pooled together for overall management. An application environment may contain multiple groups of resources in the resource infrastructure layer and the networking infrastructure layer.

The networking infrastructure layer resources in the resource system 12 may include network switches, routers, firewalls, load balancers, etc. When switches are present in the resource system 12, the management system 10 may control and configure virtual local area networks (VLANs).

An external interface 24 in the resource system 12 provides an interface between the management system 10 and external systems that may provide other value-added services. The external interface 24 may have a billing interface 26 in communication with a billing system (not shown) for providing billing functions related to actual customer use of resources or according to the operating objective guaranteed to the customer. The deployment mechanism 22 communicates with the billing interface 26 to perform billing related functions. The deployment mechanism 22 provides the billing interface 26 with information about resource allocation such as when a resource in the resource system 12 has been allocated to an application environment.

Other external systems for which there may be an interface in the external interface 24 may include various operational support systems such as other system management applications, content management applications, fault management applications and customer portals.

Data Storage

The data storage 20 is in communication with the deployment mechanism 22, the data acquisition mechanism 14, the state determination mechanism 16 and the resource change mechanism 18 to facilitate the transfer of information between these components (such as reading and updating data). The data storage 20 contains information such as resource identifiers, configuration and performance and demand information for each of the resources in the resource system 12.

The data storage 20 contains information on all physical assets in the resource system 12 such as servers, network switches, routers, firewalls, load balancers, software and licenses. The data storage 20 also contains information on logical assets in the resource system 12 and the management system 10 such as Internet Protocol (IP) addresses, virtual local area network (VLANs), application infrastructure topologies, security policies and service level agreements for the application environments that may dictate their operating objective.

The data storage 20 contains information on the groupings and poolings of resources in the resource system 12 for management purposes. This grouping and pooling information may include information on the resources that are not allocated that are grouped together, and information on the resources that are allocated that are grouped together, and information on the groups that form specific pools. Each of these group information sets may contains an identification of each resource in the group, the size of the group, the number of active and idle resources in the group and the priority of the group and the pool to which the group belongs.

Data Acquisition Mechanism

Figure 2:
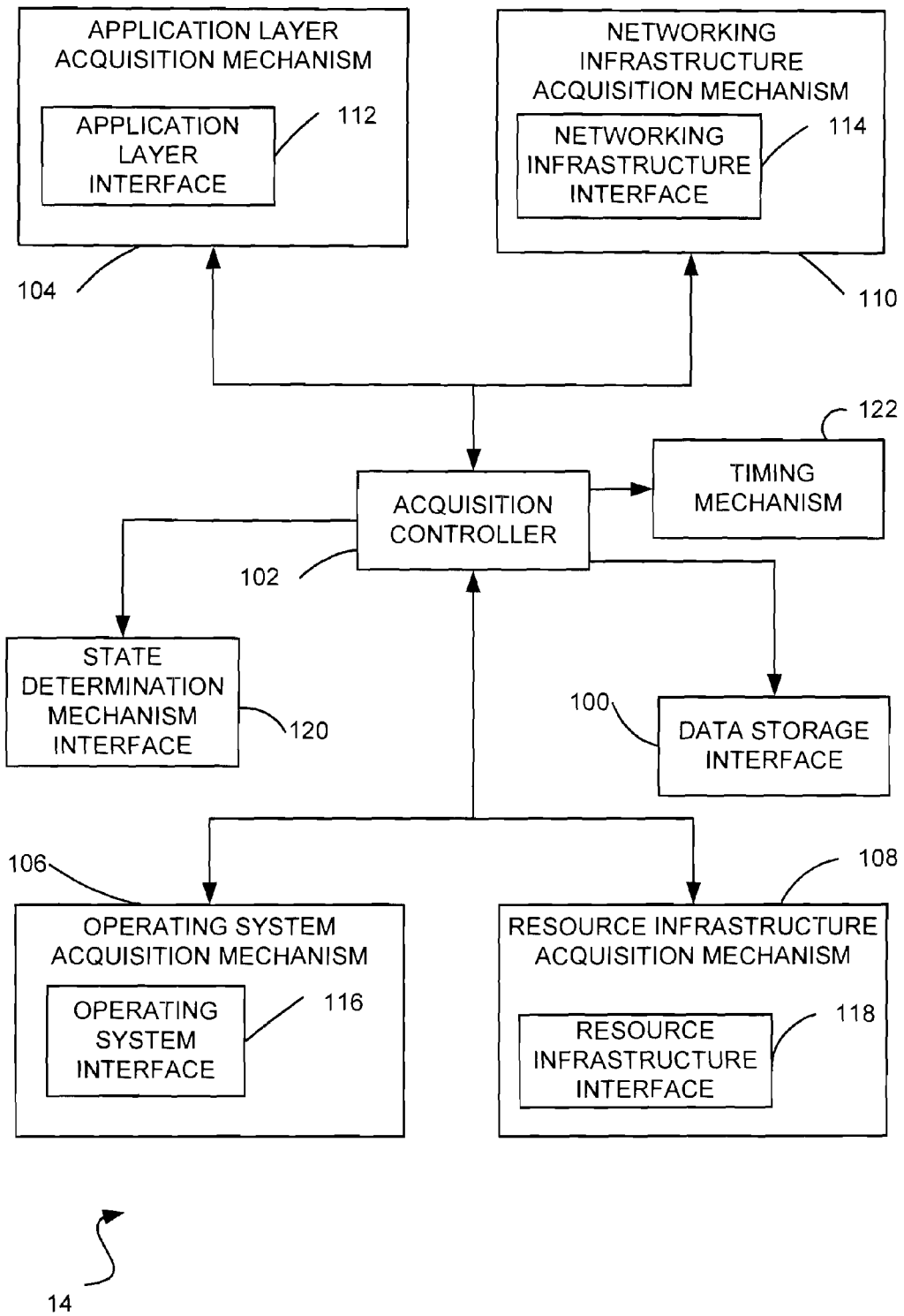
FIG. 2 is a system diagram of a data acquisition mechanism of the management system of FIG. 1.

FIG. 2 is a system diagram of the data acquisition mechanism 14 of FIG. 1. The data acquisition mechanism 14 acquires and pre-processes performance data from an application environment being managed by the management system 10. The data acquisition mechanism 14 interfaces with the application layer, the operating system layer, the resource infrastructure layer and the networking infrastructure layer for the purposes of gathering performance and demand information from a specific application environment.

The data acquisition mechanism 14 contains an application layer acquisition mechanism 104, an operating system acquisition mechanism 106, a resource infrastructure acquisition mechanism 108 and a networking infrastructure acquisition mechanism 110, all of which gather information from their respective layers of an application environment.

Each of these acquisition mechanisms 104, 106, 108, 110 is in communication with an acquisition controller 102 that controls the data acquisition from each layer of the application environment. A timing mechanism 122 in communication with the acquisition controller 102 controls the timing of the data acquisition. The timing mechanism 122 keeps a record of the last set of data obtained from each layer in each application environment. At predetermined periodic intervals the timing mechanism 122 informs the acquisition controller 102 that a predetermined time period has elapsed. In response to the lapsed time limit, the acquisition controller 102 sends a command to one of the acquisition mechanisms 104, 106, 108, 110 to obtain data from a specific application environment. The acquisition of data from each layer in the application environment may be performed simultaneously or may be staggered.

Information from the application layer is gathered by the application layer acquisition mechanism 104. The application layer acquisition mechanism 104 has an application layer interface 112 for gathering information by interfacing with web servers, application servers and database servers in the resource system 12. The application layer interface 112 may obtain information such as processing speed of requests in the application environment and response time to requests.

The operating system acquisition mechanism 106 has an operating system interface 116 for gathering information from the operating system layer through mechanisms in the operating system(s) used by the infrastructure and application layers that expose performance information. The operating system layer information may include a representation of the processing power used to the total processing power available and a representation of the memory used to the total memory available.

The resource infrastructure acquisition mechanism 108 has a resource infrastructure interface 118 for gathering information on the resource infrastructure layer by interfacing with servers and other computing resources in the resource system 12. The resource infrastructure layer may include information on how much of the total processing power is currently being used as well as information on how much of the total memory is currently being used. This information is based on the resource groups that have been allocated to a specific application environment and relate to that application environment.

The networking infrastructure acquisition mechanism 110 has a networking infrastructure interface 114 for gathering networking information from the networking infrastructure layer by interfacing with switches, routers, firewalls and load balancers. The networking infrastructure layer information may include information on how much of the bandwidth allocated to an application environment is being used, and the transaction rates at a protocol level.

The performance demand information obtained by the application layer acquisition mechanism 104, the operating system acquisition mechanism 106, the resource infrastructure acquisition mechanism 108 and the networking infrastructure acquisition mechanism 110 may be from a resource, a resource group or an entire application environment.

The application layer acquisition mechanism 104, the operating system acquisition mechanism 106, the resource infrastructure acquisition mechanism 108 and the networking infrastructure acquisition mechanism 110 pass the performance and demand information to the acquisition controller 102. The acquisition controller 102 extracts the performance and demand information from the data acquired and passes this performance and demand information to an state determination mechanism interface 120 to be forwarded to the state determination mechanism 16.

The acquisition controller 102 passes the information as acquired to a central data storage interface 100 to store this information in the data storage 20. In this manner the data storage 20 is provided with performance and demand information obtained from the resources in the application environment being managed by the management system 10.

State Determination Mechanism

The state determination mechanism 16 manages the resource requirements for an application environment. The state determination mechanism 16 monitors the performance of an application environment and predicts future demand levels for the application environment to maintain the operating objective. The state determination mechanism 16 determines changes necessary to resources configured to a given application environment. The resources configured to the application environment may be reconfigured according to their allocation to the application environment, the number of resources being used by the application environment, etc., to maintain the operating objective for the application environment.

Prediction Mechanism

Figure 3:
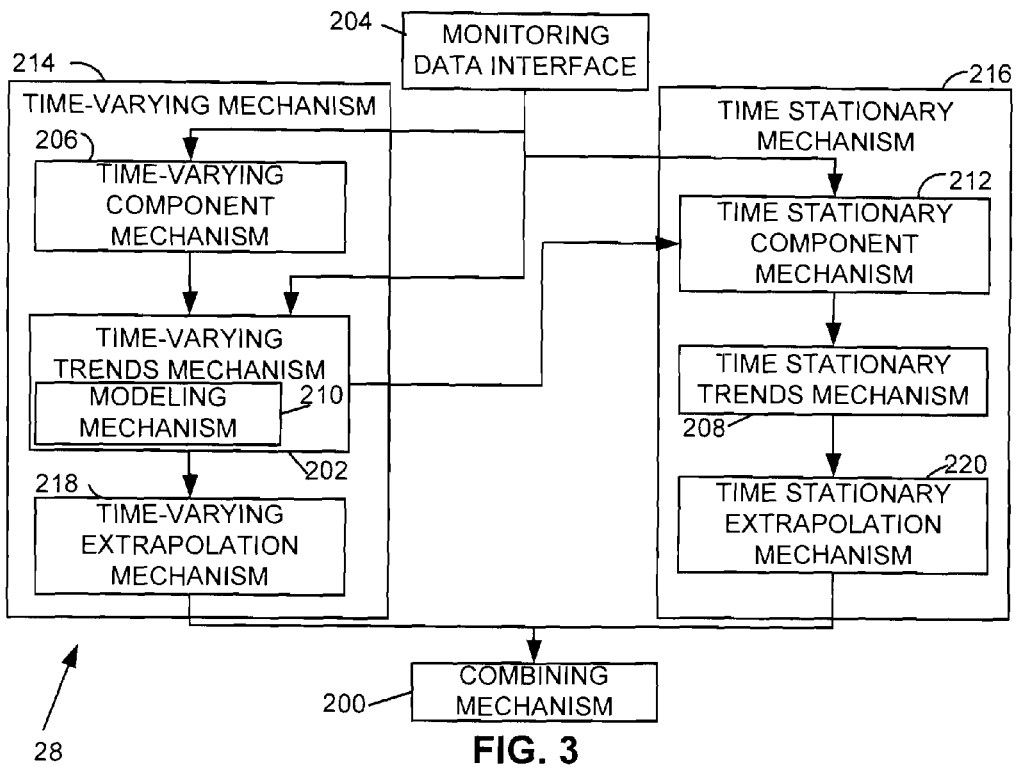
FIG. 3 is a system diagram of a prediction mechanism of the management system of FIG. 1.

FIG. 3 shows a system diagram of the prediction mechanism 28 of the state determination mechanism 16. The prediction mechanism 28 predicts future demand for the resources managed by the management system 10. Demand information for a particular resource is used by the prediction mechanism to determine both time-varying and stationary, or time-serial, trends.

The prediction mechanism 28 receives demand information from the data acquisition mechanism 14 at a monitoring data interface 204. This information may be obtained by the data acquisition mechanism 14 from each resource and may include information such as the demand on that particular resource over a given period of time. Prediction of demand may be based on data representing a single measurement from one of the layers in an application environment that can be considered to be representative of the entire application environment. Alternatively, multiple measurements may be combined to provide an overview of the application environment.

The prediction mechanism 28 includes a time-varying mechanism 214 for determining the time-varying component of the future demand and a time-stationary mechanism 216 for determining the time-stationary component of the future demand.

A time-varying trends mechanism 202, a time-varying component mechanism 206 and a time stationary component mechanism 212 receive this demand information from the monitoring data interface 204. The time-varying component mechanism 206 receives the demand information from the monitoring data interface 204 to determine an autocorrelation function for this information. An autocorrelation of the demand information extracts a periodic character from the demand information. This periodic character is used to create a periodic time series model (or autocorrelation function) of the demand information that can be used to determine a model for the time-varying component of the demand information.

The time-varying trends mechanism 202 receives the periodic time series model from the time-varying component mechanism 206 and the demand information. The time-varying trends mechanism 202 analyzes this information to determine time-varying trends in the demand information for a particular resource. The time-varying trends are those patterns of demand of the resource that occur at regular intervals, such as every day at a particular time, a particular day of the week, etc. A modeling mechanism 210 in the time-varying trends mechanism 202 creates a model of the time-varying information in the demand information. The modeling mechanism 210 creates the model of the time-varying information based on a known type of experimental design, such as two factor full factorial design without replication.

The time-varying trends model created by the modeling mechanism 210 is periodic. This characteristic of periodicity is leveraged by a time-varying extrapolation mechanism 218 to extend the model beyond the results provided to predict the future demand based on the recurring periodic nature of the current demand as represented in the demand information when demand levels are relatively consistent.

The time stationary component mechanism 212 receives the demand information as well as information from the time-varying trends mechanism 202 on the time variation components of the demand information. The time varying components are removed from the demand information by the time stationary component mechanism 212 and the result is provided to a time stationary trends mechanism 208.

The time stationary trends mechanism 208 receives the stationary components of the demand information from the time stationary component mechanism 212. The time stationary trends mechanism 208 creates a model to determine time-serial trends in the demand information. The time-serial trends in the demand information represents randomness and growth in demand. The time stationary trends mechanism 208 creates the model of time-serial trends in the demand information based on a known statistical technique such as the linear autoregressive model.

The time-serial trend model created by the time stationary trends mechanism 208 is periodic. This characteristic of periodicity is leveraged by a time-stationary extrapolation mechanism 220 to extend the model beyond the results provided to predict the future demand based on the recurring periodic nature of the current demand as represented in the demand information. There is an assumption with this extension that there will not be any large singular demands and that demand levels will remain relatively consistent.

The future demand components extrapolated by the time-varying extrapolation mechanism 218 and the time stationary extrapolation mechanism 220 are passed to a combining mechanism 200 where models generated by the time-varying trends mechanism 210 and the time stationary trends mechanism 208 are combined to provide a prediction for future demand levels. This combination may be an aggregation of the time-varying model and the stationary model.

Figure 4:
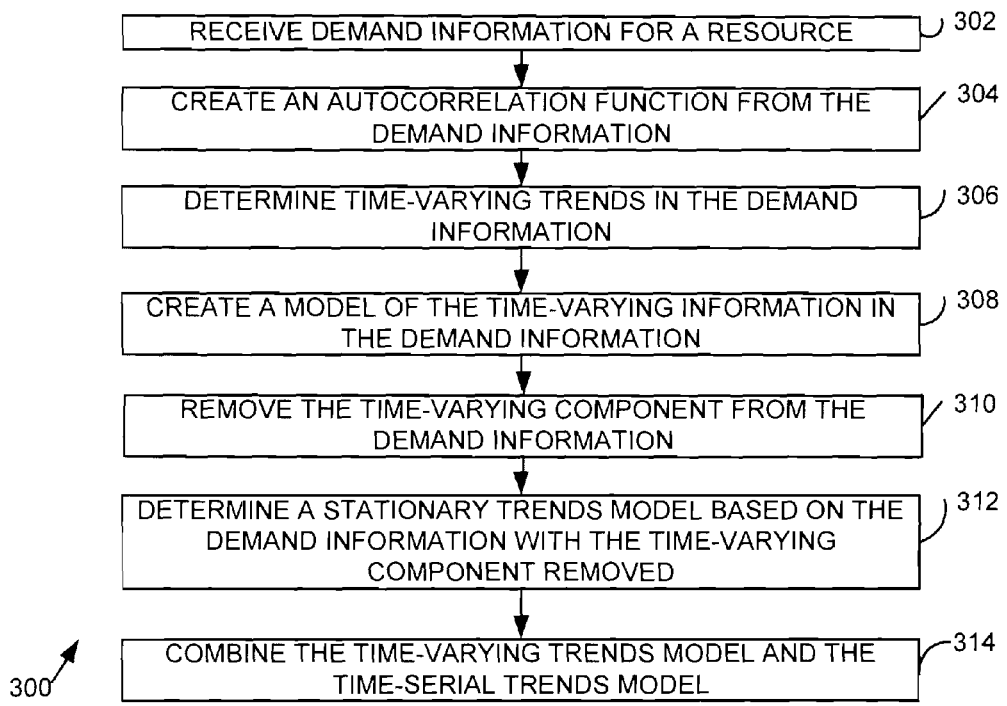
FIG. 4 is a flow diagram representing the prediction mechanism of FIG. 3.

FIG. 4 is a flow diagram of a method 300 from the prediction mechanism 28 for predicting a future demand level based on demand information. Demand information is received in step 302. This demand information is used to create an autocorrelation function, or a periodic time series model in step 304. The autocorrelation function with the demand information are used to determine time-varying trends for the demand information in step 306.

The time-varying trends determined in step 306 are used to create a model of the time-varying information in the demand information in step 308. The model of the time-varying information may be created using a known type of statistical experimental design, such as the two factor full factorial design without replication. Since the time-varying trends model is periodic, the periodicity can be leveraged to extend the model beyond the results provided to predict the future demand based on the recurring periodic nature of the current demand.

The time-varying component of the demand information determined in step 308 is removed from the demand information in step 310 to produce the stationary component of the demand information. The stationary components of the demand information is then used to determine a model of time-stationary trends in step 312. The time-serial trend model may be determined according to a known statistical technique such as the linear autoregressive model. The time-serial trend model created is periodic. This characteristic of periodicity can be leveraged to extend the model beyond the results provided to predict the future demand based on the recurring periodic nature of the current demand as represented in the demand information.

The time-varying trends model and the time-serial trends model are combined into a single model in step 314. The time-varying trends model can be used to estimate future demands on the resource being considered according to time-varying considerations. The time-serial trends model can be used to estimate future demand on the resource being considered according to factors other than time. The combined model provides a prediction of the future demand for the managed resource from which the demand information came taking into account time and other factors.

Response Modeling Mechanism

The response modeling mechanism 30 estimates each application environment's response to incoming traffic. The response modeling mechanism 30 obtains the predicted future demand load produced by the prediction mechanism 28 and current performance information for a particular application environment from the data 10 acquisition mechanism 14. The current performance information contains data pertaining to current demand loads for that application environment as well as data on the performance of the application environment under that demand (e.g. utilization of resources allocated to the application environment). Based on this information sufficiency of the application environment's resources can be determined by taking into consideration changing levels of demand.

Based on the predicted demand the response modeling mechanism 30 estimates how the application environment will perform under the future load conditions. The response modeling mechanism 30 uses a statistical technique, such as the linear regression model, to determine performance and demand parameters, such as service time, service rate, variance, etc.

Based on the operating objective for the application environment, the predicted demand rate from the prediction mechanism 28 and the performance and demand parameters, the response modeling mechanism 30 uses, for example, a single-station queuing model, such as M/M/1 (M-distribution of interarrival times is exponential/M-distribution of service demand times is exponential/1–number of servers). The model generated by the response modeling mechanism 30 produces the demand rate at which the current resources in the application environment will not be able to maintain the operating objective and the predicted operating objective that will be provided under the predicted demand.

Objective Difference Mechanism

Figure 5:
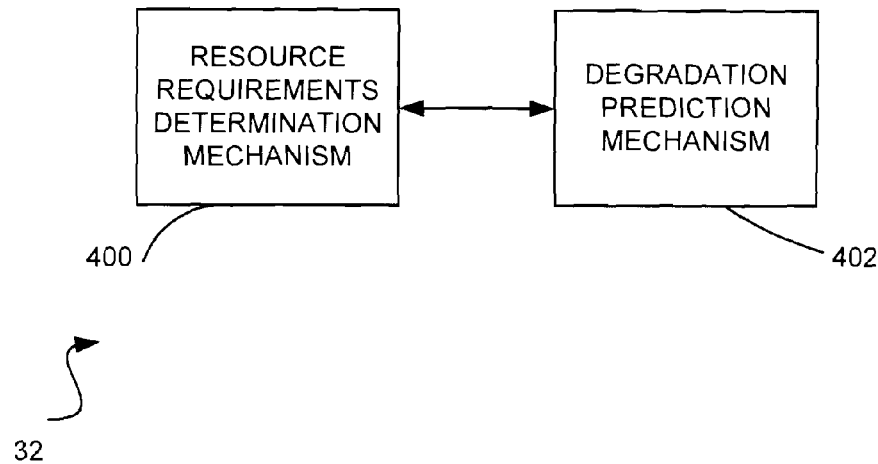
FIG. 5 is a system diagram of a objective difference mechanism of the management system of FIG. 1.

FIG. 5 is a system diagram of the objective difference mechanism 32. The objective difference mechanism 32 obtains information from the response modeling mechanism 30 to determine how the operating objective is being met by each application environment and what changes should be made to maintain this operating objective. A resource requirements determination mechanism 400 in the objective difference mechanism 32 determines resource requirements for an application environment under predicted levels of demand to maintain the operating objective.

The resource requirements determination mechanism 400 takes real environment performance information indicating the resources used, level of demand and the performance of the application environment under these conditions. Given the current resources used by the application environment and the performance of the application environment, the resource requirements determination mechanism 400 determines operating requirements of the application environment. The resource requirements of the application environment under the predicted level of demand can be extrapolated from the current performance.

A degradation prediction mechanism 402 in the objective difference mechanism 32 predicts how the performance of an application environment will degrade if the resource requirements determined by the resource requirements determination mechanism 400 are not implemented. The degradation prediction mechanism 402 compares the predicted degradation of performance with operating objectives for the application environment to determine the discrepancies between the degraded service and the operating objective.

Resource Change Mechanism

The resource change mechanism 18 uses information obtained from the state determination mechanism 16 to reconfigure and allocate resources to satisfy the requirements of every application environment in the management system 10. The resource change mechanism 18 balances resource utilization and application environment performance based on the resource requirements as indicted by the state determination mechanism 16. Based on resource requirements for each application environment the resource change mechanism 18 determines where each individual resource will be allocated. Given finite resources, the resource change mechanism 18 balances resource allocation among application environments according to demand and operating objectives for each application environment. The resource change mechanism 18 has an optimization mechanism 38 that accepts the resource requirements information from the state determination mechanism 16 and determines the resource configuration that best meets the anticipated needs of each application environment. This new resource configuration is analyzed by a stabilization mechanism 36 to ensure that the resource requirements for each application environment were determined under stable conditions, without erratic fluctuations in the demand, and that each application environment will remain this way after the changes. After the new resource configuration has been deemed stable a resource group manager 34 determines those individual resources that will be added/removed from each application environment to meet the anticipated demand changes.

Optimization Mechanism

Figure 6:
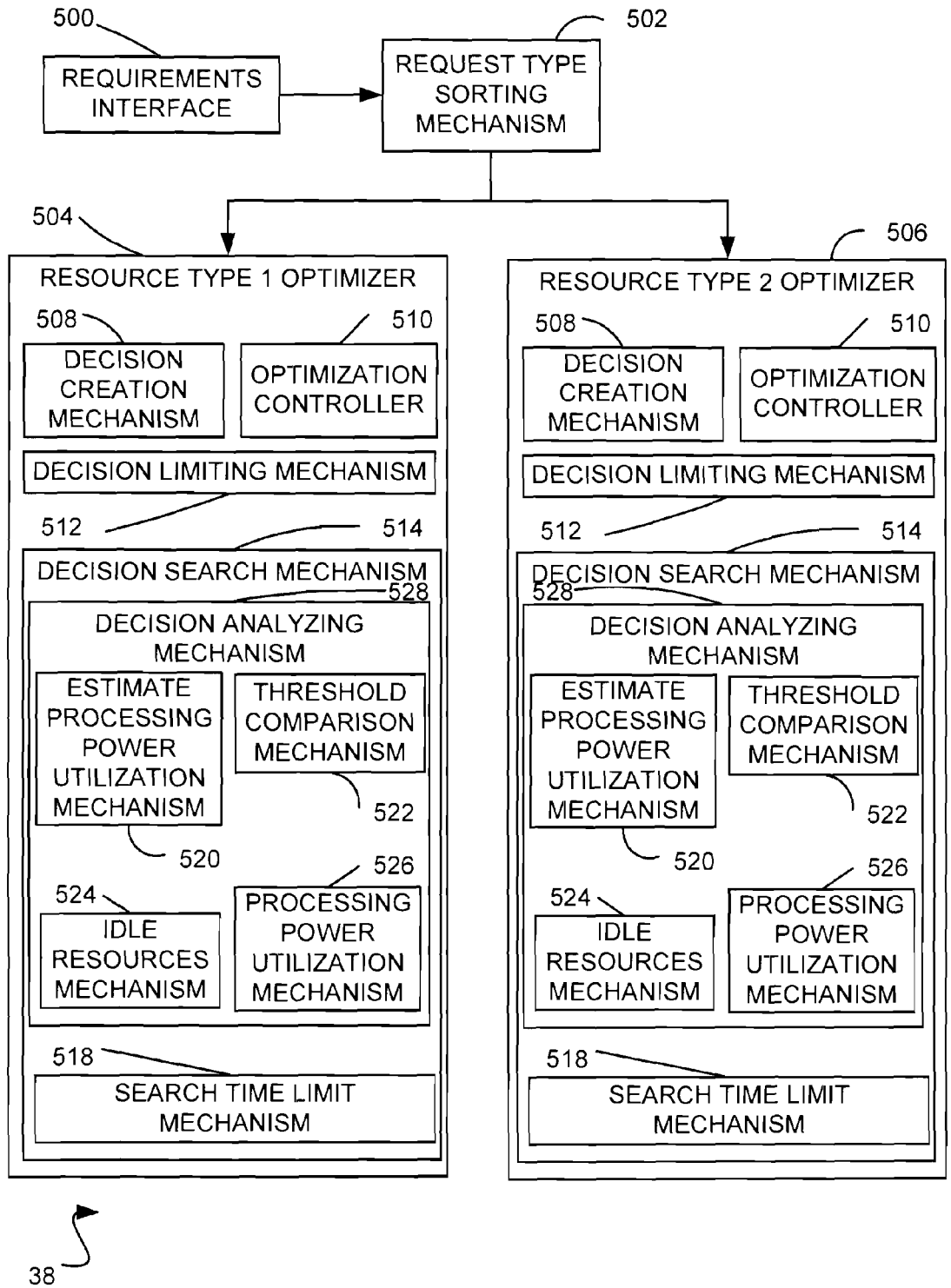
FIG. 6 is a system diagram of an optimization mechanism of the management system of FIG. 1.

FIG. 6 is a system diagram of the optimization mechanism 38 of FIG. 1. The optimization mechanism 38 uses the anticipated resource requirements provided by the state determination mechanism 16 to determine a balance between requirements for different application environments competing for the same resources. The optimization mechanism 38 takes into consideration the operating objective for each application environment to maintain objectives for those application environments for which it is critical that a determined objective be maintained.

The optimization mechanism 38 receives anticipated resource requirements at a requirements interface 500. The requirements interface 500 passes this information to a request type sorting mechanism 502. The request type sorting mechanism 502 sorts requests according to the type of resource requested. For example, requests for an additional server with a Unix operating system are sorted from those requests for an additional server with a Windows operating system.

The optimization mechanism 38 contains a resource optimizer for each type of resource in the resource system 12. Resource type 1 optimizer 504 and resource type 2 optimizer 506 are provided as examples. Each resource optimizer 504, 506 contains a decision creation mechanism 508, a decision limiting mechanism 512, a decision search mechanism 514 and an optimization controller 510. The resource optimizers 504, 506 create decision trees based on the resource request received, the available resources, the operating objective for the current application environment and the operating objective for all other application environments.

The request type sorting mechanism 502 passes the resource request to the relevant resource optimizer 504, 506 corresponding to the requested resource type. The optimization controller 510 receives the resource request and coordinates creation and analysis of a decision tree containing various possible implementations of the request.

The decision creation mechanism 508 creates a decision tree under the control of the optimization controller 510. Each branch in the decision tree may specify the number of resources to be added or removed from each unallocated resource group and each allocated resource group for the given type of resource. The decision tree is created by determining possible combinations, changes or permutations in the resource allocation and then determining possible second step combinations, etc., for both current moment in time and throughout the future predicted time horizon. Starting with the current configuration of each resource in the application environment, new branches are created for possible configuration changes that result in a new configuration. Each branch represents a possible solution to the resource constraints problem.

The tree may be created upon receipt of the resource request at the optimization controller 510. In this case the tree may exhaustively include all possible options or may be created to include a specified number of possible options. Alternatively, each branch of the tree may be created immediately before the branch is analyzed.

After the decision tree, or the current branch, has been created the decision limiting mechanism 512 assesses the quality of the solution proposed by each branch. Those branches not providing an acceptable solution are removed from the tree to reduce the size of the tree thereby reducing the size of the search space for a good solution to the resource constraints problem. The tree may be trimmed, for example, by a heuristic prune using stability, history, resources, limits or extremely bad results. Trimming based on stability removes those branches in the decision tree that would cause excessive opposing configuration changes during the predicted time horizon. Trimming based on history removes those branches in the decision tree that oppose recent past configuration changes. Trimming based on resources removes those branches in the decision tree that do not meet resource constraints such as infrastructure limits, connection limits, etc. Trimming based on limits removes those branches in the decision tree that violate minimum and maximum resource group limits defined by the operating objective for an application environment. Trimming based on extremely bad results removes those branches from the decision tree that provide bad performance results.

After the decision tree has been trimmed, the decision search mechanism 514 examines the branches of the tree to determine a sufficiently good set of resource changes. The decision search mechanism 514 may prioritize branches of the tree so that branches having a likely favorable outcome are analyzed first. The prioritization may be performed on the basis of the best-case requests from each state determination mechanism 16 and then ordering "killer moves" from previous iterations, techniques that are well known in the art.

A decision analyzing mechanism 528 in the decision search mechanism 514 determines a quantitative preference for the result that would be provided if the changes indicated in a branch of the decision tree were to be implemented. The quantitative preference is determined according to a quantitative assessment of various properties of the results produced by the changes.

A search time limit mechanism 518 may be used to limit the time during which the branches of the decision tree are searched for a suitable solution. The solution chosen may be the best quantitative preference value determined before the expiry of a predetermined time limit counted by the search time limit mechanism 518. The search limit mechanism 518 starts a timer for the predetermined time limit and at the expiry of that time the branch with the best preference value is chosen. The best preference value may be, for example, the largest value.

A quantitative preference analysis for the preference of a solution represented by a branch in the decision tree is based on properties of the solution such as an estimated processing power utilization, idle resources, a resource change threshold and current processing power utilization and probability of not meeting the operating objective for an application environment. The quantitative preference analysis may be based on business objectives, such as service level or operating objective optimization. Different business objectives may lead to different methods of performing the quantitative preference analysis.

A processing power utilization mechanism 526 in the decision analyzing mechanism 528 determines a preference value for each resource group affected by a decision represented by a branch based on the amount of processing power currently being used in comparison to the total processing power available to that group. The processing power utilization preference values are determined so that branches that have processing power utilization at a desired target value are favored whereas other branches are penalized.

Figure 9:
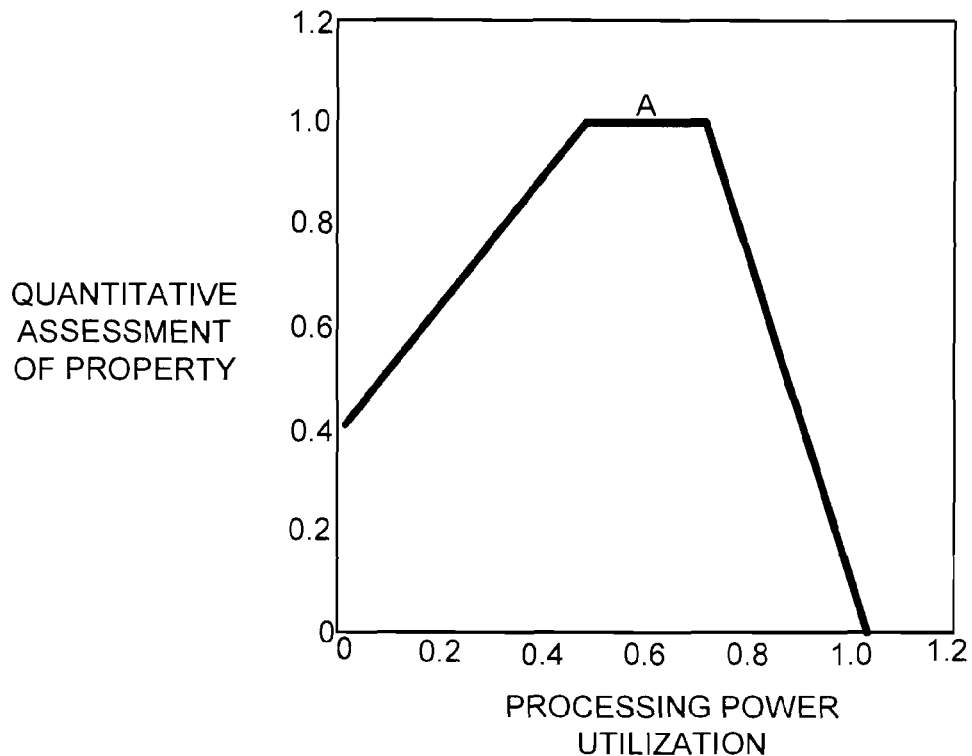
FIG. 9 is a graph showing a processing power utilization curve.

A sample curve shown in FIG. 9 is used to determine the preference value for the facet of processing power utilization. The processing power utilization corresponds to a ratio of available processing power to processing power being used. Segment A of the graph in FIG. 9 shows a target processing power utilization zone. The preference value is determined according to the processing power currently being used. The preference value may be scaled according to operating objective of an application environment. For example, the quantitative preference value may be scaled between 0.5 to 1.5 with application environments considered to be very important and having a high operating objective being scaled higher. In this manner, an application environment having a higher operating objective should be more favorable for the addition of resources (and less favorable for the removal of resources) than an application environment having a lower operating objective if the best aggregated preference value is the highest value.

An idle resources mechanism 524 in the decision analyzing mechanism 528 determines an idle resources preference value to consider the impact of resources that are not being used on the performance of the resource group. The idle resources preference value favors decisions that bring the number of idle resources in a group to a target value.

Figure 10:
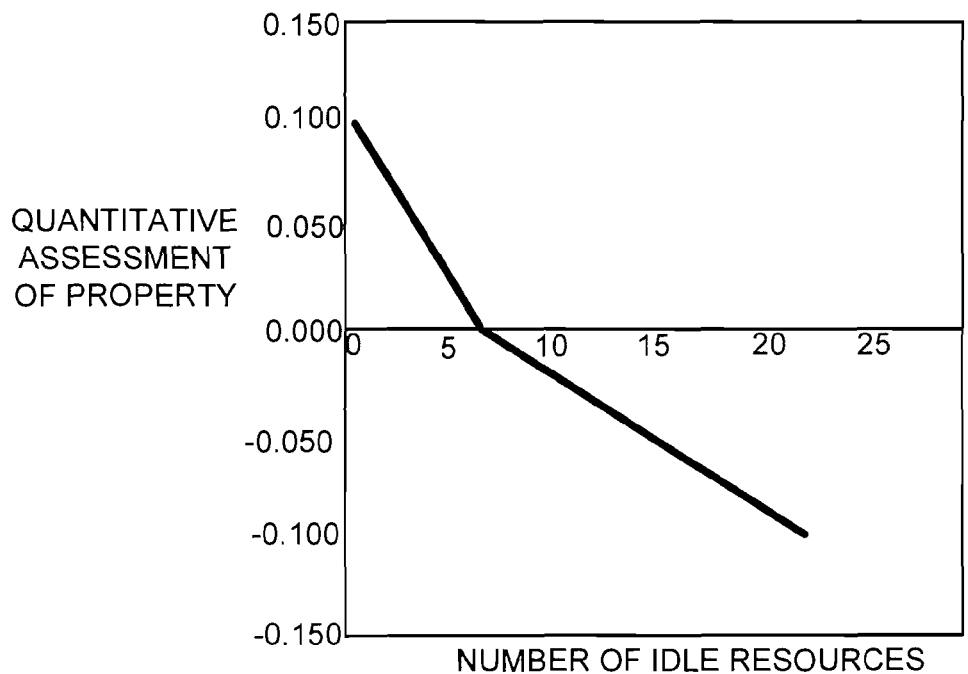
FIG. 10 is a graph showing an idle resources curve.

A sample curve shown in FIG. 10 is used to determine the idle resources preference value. When there are few idle resources the idle resources preference value is large as a higher processing power utilization is to be reached before idle resources can be used. Conversely, when the number of idle resources is large, the idle resources preference value decreases allowing idle resource to be used at lower processing power utilization values. The values shown in FIG. 10 are for exemplary purposes only.

A threshold comparison mechanism 522 in the decision analyzing mechanism 528 uses a resource change threshold preference value to reduce the effects of small changes in processing power utilization. To achieve this, the aggregate preference value for a branch is compared to the resource change threshold preference value and only those values with an aggregate preference value greater than the resource change threshold preference value are kept, whereas those not meeting the threshold preference value are reset to a null value. The resource change threshold preference value is determined based on the number of changes to resources made in each branch. The first resource change overcomes a first threshold value that is generally significant in order to avoid frequent but small changes. Subsequent changes are compared to a second threshold value that is smaller than the first threshold value as the effects of subsequent changes is often less.

An estimate processing power utilization mechanism 520 in the decision analyzing mechanism 528 determines the estimate of the resource changes in a given resource group on the effect on the processing power utilization. This preference value is determined according to the current processing power utilization scaled according to a ratio of the current number of resources to the new number of resources indicated in the resource changes of the current branch.

These preference values are determined for the changes to each resource group of the given resource type. The values for all groups of the resource type are then aggregated to determine an overall preference for the decision represented by the branch. A preference value for each branch in the decision tree is determined. The branch or node with the best preference value is adopted as the new group target configuration. Since the decision tree may be large, the determination of a quantitative preference value for each branch in the tree may be cumbersome.

Stabilization Mechanism

The stabilization mechanism 36 analyzes the resource changes determined by the optimization mechanism 38 to determine if similar changes were recently implemented. The analysis of the resource changes may include assessing if the resource changes are feasible (e.g. are there a sufficient number of unallocated resources). The stabilization mechanism 36 filters resource changes made by the optimization mechanism 38 to maintain stability in the allocation and configuration of the resource in the resource system 12 to prevent these resources from being reconfigured and reallocated as a result of erratic changes in demand or performance of an application environment. The stabilization mechanism 36 may, for example, apply a time-based filter that prevents multiple opposing changes for a specified period of time. The stabilization mechanism 36 may also remove changes to resource groups that have pending changes being performed by the deployment mechanism 22.

Resource Group Manager

The resource group manager 34 is responsible for the management and allocation of currently unallocated groups of resources. Groups of resources that are not allocated may be given a preliminary configuration by the resource group manager 34. The preliminary configuration given to these groups allows for rapid allocation of the resource in a group to an application environment. The resource group manager 34 monitors allocated resources to determine the general configuration (e.g. operating system, etc.) that are most frequently used. Based on such observation the resource group manager 34 may configure groups of unallocated resources such that there are more resources available that have a configuration that is used more often.

Deployment Mechanism

Figure 7:
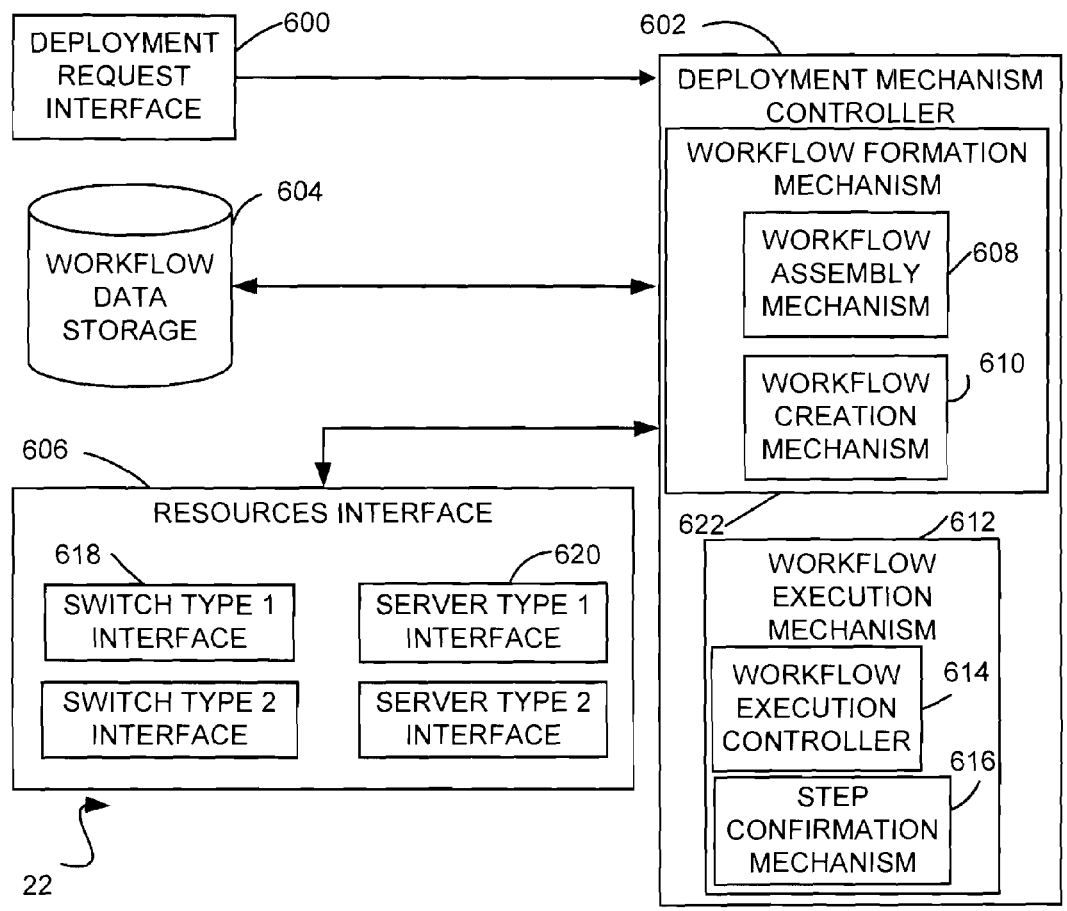
FIG. 7 is a system diagram of a deployment mechanism of the management system of FIG. 1.

FIG. 7 is a system diagram of the deployment mechanism 22. The deployment mechanism 22 is responsible for creation, storage and execution of repeatable workflows that automate configuration and allocation of the resources in the resource system 12. A workflow represents a reconfiguration command determined by the resource change mechanism 18. The reconfiguration command is an abstract idea (e.g. add a server to an application environment) that would not be recognizable by the resources in the resource system 12. A workflow is a series of concrete steps that are recognizable by the resources (e.g. set internet protocol (IP) address) and together implement the abstract reconfiguration command and may consist of a series of high-level commands that are themselves represented by a series of more detailed commands. The workflow may represent an entire reconfiguration process affecting multiple resources or a single step in a larger reconfiguration process.

The deployment mechanism 22 receives a reconfiguration command at a deployment request interface 600 from the resource change mechanism 18. The deployment request interface 600 forwards the reconfiguration commands to a deployment mechanism controller 602.

The deployment mechanism controller 602 has a workflow formation mechanism 622 and a workflow execution mechanism 612. The workflow formation mechanism 622 includes a workflow assembly mechanism 608 and a workflow creation mechanism 610 that function together to form a workflow that will implement a change.

The workflow assembly mechanism 608 receives the reconfiguration command and coordinates the translation of the reconfiguration command into an executable workflow. The workflow assembly mechanism 608 searches a workflow data storage 604 to determine if the reconfiguration command, or parts of the reconfiguration command, can be represented by workflows that have been previously created and stored in the workflow data storage 604. If the entire reconfiguration command, or parts thereof, are not found in the workflow data storage 604 then the workflow creation mechanism 610 creates workflows that will implement those missing parts.

After a workflow has been determined for the reconfiguration command, the workflow execution mechanism 612 receives the workflow for execution. The workflow execution mechanism 612 determines the resource to which each step in the workflow pertains. The workflow execution mechanism 612 passes a command corresponding to each step in the workflow to a resources interface 606. A workflow execution controller 614 in the workflow execution mechanism 612 controls execution of the workflow. The workflow execution controller 614 may provide multiple working threads to allow for the simultaneous execution of multiple workflows.

A step confirmation mechanism 616 in the workflow execution mechanism 612 waits for confirmation of successful implementation of the step on the destination resources. If such a confirmation does not arrive in a predetermined time interval, the step confirmation mechanism 616 informs the workflow execution controller 614. The workflow execution controller 614 may wait for a predetermined time before executing the next step. If the previous step was not successfully implemented then the workflow execution controller 614 may re-execute that previous step. This ensure that each step in the workflow has been successfully implemented before subsequent steps are executed. Alternatively, the workflow execution controller 614 may decide to continue execution of the workflow regardless of the successful, or unsuccessful implementation of each step in the workflow.

The resources interface 606 contains an interface to each type of resource in the resource system 12 that can be configured. For example, the resources interface 606 may contain an interface for a first type of switch 618 and another interface for a second type of switch as well as an interface for a first type of server 620 and a second type of server, etc. The workflow execution mechanism 612 forwards a command to the appropriate interface 618, 620 corresponding to the resource that is to be affected by the command. The interfaces 618, 620 format the command messages received from the workflow execution mechanism 612 into a form that is recognizable to the destination resource. The interfaces 618, 620 send the formatted command to the destination resource and await confirmation of the change in configuration.

Figure 8A:
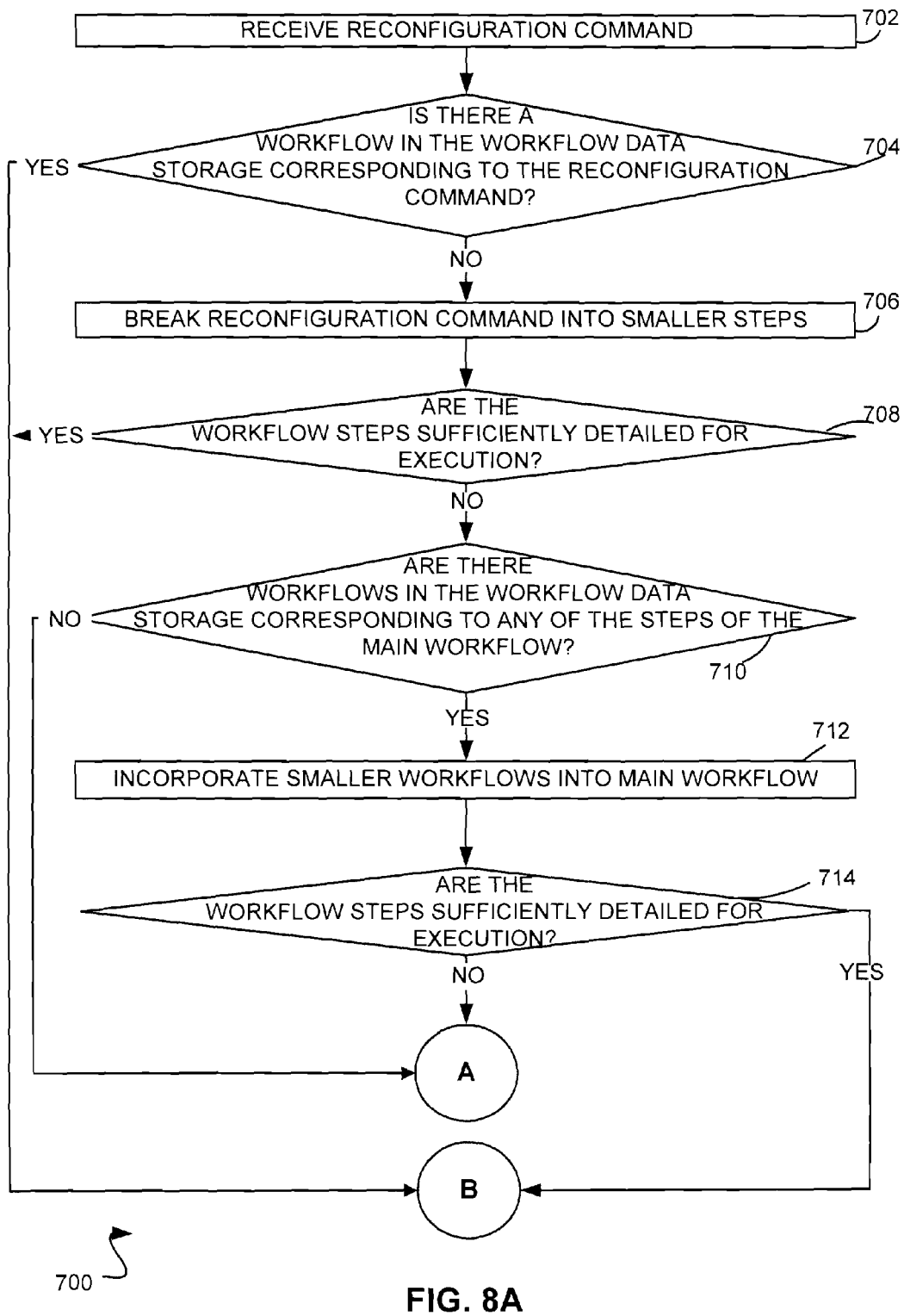
FIGS. 8A and B are a flow diagram representing the deployment mechanism of FIG. 7.
Figure 8B:
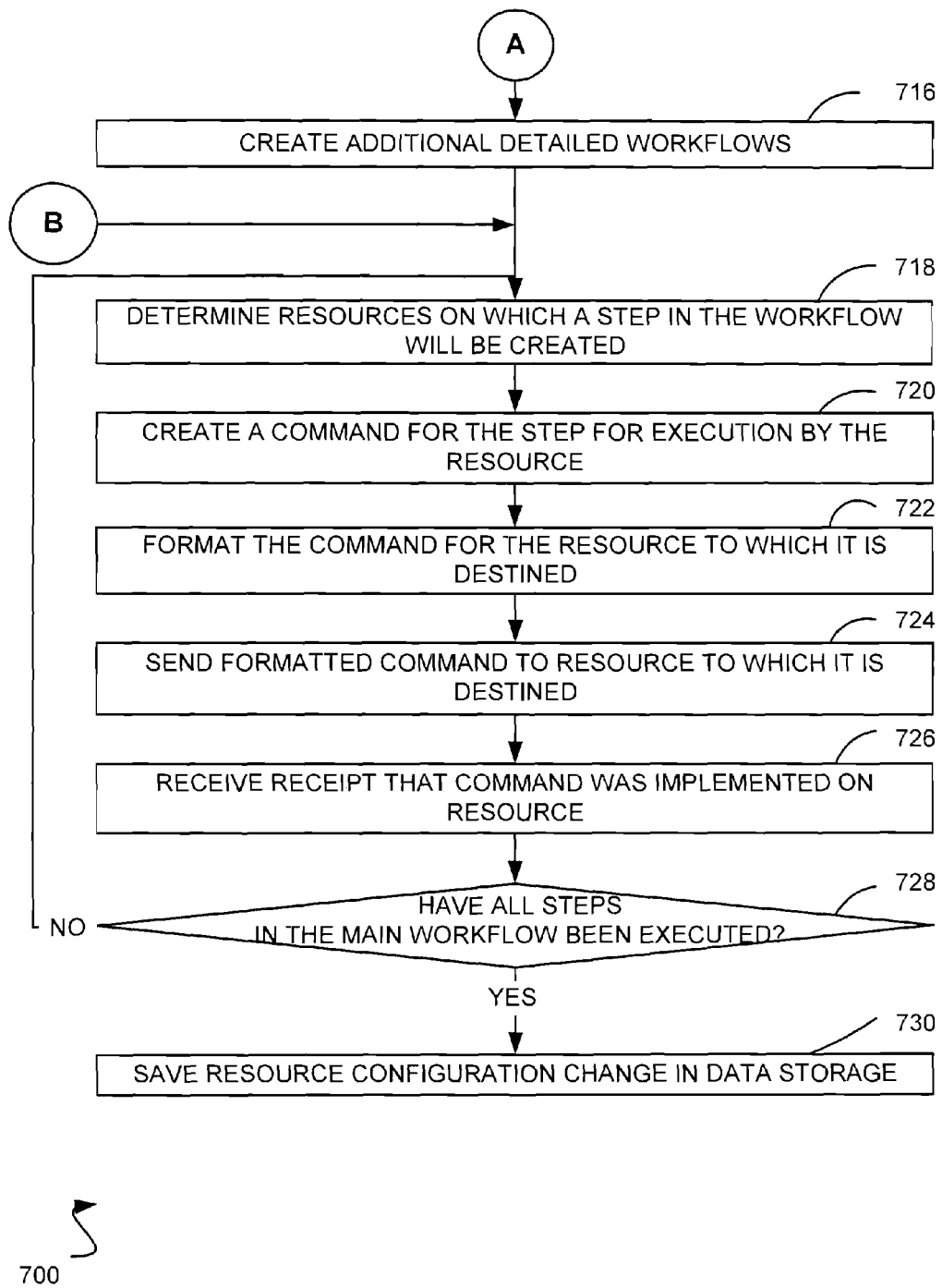

FIGS. 8A and B are a flow diagram of a method 700 of deploying a command to resources in the resource system 12. A reconfiguration command is received in step 702. The workflow data storage 604 is searched in step 704 to determine if there are any existing workflows that have been previously created for performing the function represented in the reconfiguration command. If the reconfiguration command can be completely represented by a workflow in the workflow data storage 604 then the workflow is ready to be executed and processing continues to step 718. If the reconfiguration command cannot be completely represented by a workflow in the data storage 604 then the reconfiguration command is broken down into smaller steps in step 706.

The workflow formed from the smaller steps of the reconfiguration command are examined in step 708 to determine if they are sufficiently detailed to be executed by the resource for which they are destined. If the workflow steps are sufficiently detailed then processing continues to step 718. If the workflow steps are not sufficiently detailed then the workflow data storage 604 is searched again in step 710 to determine if any of the smaller steps into which the reconfiguration command has been broken have corresponding smaller workflows. If there are not workflows in the workflow data storage that correspond then processing continues to step 716. If any corresponding smaller workflows are found for the steps then these are incorporated into the main workflow in step 712.

The main workflow, with the addition of the smaller workflows, is examined again in step 714 to determine if all steps are sufficiently detailed for execution by the destination resource. If the workflow steps are now sufficiently detailed then processing continues to step 718. If further level of details are necessary or additional workflows could not be found in the workflow data storage 604 then workflows are created in step 716 for those steps requiring additional detail.

After the workflow has been determined it is executed. A step in the workflow is examined to determine the resource on which the step is to be executed in step 718. A command for that step is created in step 720. The command is then formatted for the specific resource to which it is destined in step 722. The command is then sent to the resource in step 724 and receipt of the implementation of the command at the resource is received in step 726. If not all steps in the workflow have been executed, as determined in step 728, then steps 718 to 728 are repeated. If all steps have been executed then the status of the resource is saved in the data storage 20 in step 730.

The workflows may create new application environments, create new application clusters and add/remove servers to/from running application clusters. The workflows may also be created to perform any of the exemplary functions: deploy an application environment (or any part thereof) on a server, reboot a server, configure network communications on a server, communicate with switching devices to reconfigure servers on a VLAN, communicate with load balancing devices to reconfigure a cluster, reconfigure an application environment, inform fault management of an invalid action, or raise a billing event.

The data acquisition mechanism 14 obtains performance data from recently reconfigured resources in the resource system 12. This creates a closed loop system as performance information is always obtained from the resource system 12 and provided for assessment and correction of resources to maintain operating objectives.

Embodiments of the present invention may be implemented in any conventional computer programming language. For example, embodiments may be implemented in a procedural programming language (e.g. "C") or an object oriented language (e.g. "C++"). Further embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g. a diskette, CD-ROM, ROM, or fixed disk) or transmittable to a computer system, via a modem or other interface device, such as a communications adapter connected to a network over a medium. The medium may be either a tangible medium (e.g. optical or electrical communications lines) or a medium implemented with wireless techniques (e.g. microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g. shrink wrapped software), preloaded with a computer system (e.g., on system ROM or fixed disk), or distributed from a server over the network (e.g., the Internet or World Wide Web). Some embodiments of the invention may be implemented as a combination of both software (e.g. a computer program product) and hardware (termed mechanisms). Still other embodiments of the invention may be implemented as entirely hardware, or entirely software (e.g. a computer program product).

It is apparent to one skilled in the art that numerous modifications and departures from the specific embodiments described herein may be made without departing from the spirit and scope of the invention.

The invention claimed is:

1. A closed-loop system for managing an application environment having an operating state according to an operating objective, the application environment having a computing resource with a characteristics representative of an operating state of the computing resource, said system comprising:
    a state determination mechanism for determining a difference between the operating objective and a future operating state of the application environment based on a current status of the characteristic of the computing resource, wherein the state determination mechanism includes:
        a prediction mechanism for estimating a future status of the characteristic of the computing resource, the prediction mechanism including a time-varying mechanism for estimating a future time-varying status of the characteristic based on a time-varying component of the current status; a time stationary mechanism for estimating a future time stationary status of the characteristic based on a time stationary component of the current status; and a combining mechanism for combining the future time-varying status and the future time stationary status to form a future status for the characteristic;
    a response modeling mechanism for determining a response of the application environment to the future status of the characteristic, wherein the future operating state of the application environment is based on the response;
    an objective difference mechanism for determining the difference between the future operating state of the application environment and the operating objective;
    a resource change mechanism for creating a selected set of changes to the application environment to reduce of the difference;
    a data storage device for selectively storing said selected set of changes; and
    a deployment mechanism for effecting the selected set of changes on the application environment.

2. The system according to claim 1 wherein the time-varying mechanism includes:
    a time-varying component mechanism for obtaining a time-varying component from the time-varying component of the current status of the characteristic;
    a time-varying trends mechanism for determining a time-varying periodic model from the time-varying component; and
    a time-varying extrapolation mechanism for extrapolating the future time-varying status from the time-varying periodic model based on periodicity of the time-varying periodic model.

3. The system according to claim 1 wherein the time stationary mechanism includes:
    a time stationary component mechanism for extracting the time-varying component from the current status of the characteristic to obtain the time stationary of the current status;
    a time stationary trends mechanism for determining a time stationary periodic model from the time stationary component; and
    a time-stationary extrapolation mechanism for extrapolating the future time stationary status from the time stationary periodic model based on periodicity of the time stationary periodic model.

4. The system according to claim 1 wherein the resource change mechanism includes:
    a decision creation mechanism for creating a plurality of sets of changes to the application environment, each of the plurality of sets of changes resulting in a reduction of the difference;
    a decision search mechanism for assessing each of the plurality of sets of changes to determine a quantitative preference for the effect on the future operating state of the application environment of each of the plurality of sets of changes based on a property of the effect; and
    a controller for determining the selected set of changes from the plurality of sets of changes based on the quantitative preference.

5. The system according to claim 4 wherein the decision search mechanism includes:
   a plurality of property mechanism for determining a quantitative assessment of a set of changes from the plurality of sets of changes for one of a plurality of properties of the effect of the set of changes on the future operating state of the application environment;
   a decision analyzing mechanism for combining the quantitative assessment for the set of changes from each of the plurality of property mechanisms to form the quantitative preference for the set of changes.

6. The system according to claim 1 wherein the deployment mechanism includes:
   a workflow formation mechanism for forming a workflow for each change in the set of selected changes; and
   a workflow execution mechanism for performing the workflow for each change in the set of selected changes to invoke the set of selected changes.

7. The system according to claim 6 wherein the workflow formation mechanism includes:
   a workflow creation mechanism for decomposing each change in the set of selected changes into a set of steps that can be performed to invoke the changes; and
   a workflow assembly mechanism for assembling the workflow from the set of steps for each change in the selected set of changes.

8. A tangible computer readable storage medium having stored thereon computer-executable instructions for managing an application environment having an operating state according to an operating objective, the application environment having a computing resource with a characteristic representative of an operating state of the computing resource, the computer-executable instructions comprising:
   (a) determining a future operating state of the application environment based on a current status of the characteristic of the computing resource, wherein such step includes:
      estimating a future time-varying status of the characteristic based on a time-varying component of the current status;
      estimating a future time stationary status of the characteristics based on a time stationary component of the current status;
      combining the future time-varying status and the future time stationary status to form a future status of the characteristic; and
      determining a response of the application environment to the future status of the characteristic, wherein the future operating state of the application environment is based on the response;
   (b) determining a difference between the future operating state of the application environment and the operating objective;
   (c) generating a selected set of changes to the application environment for reducing the difference; and
   (d) repeating steps (a) to (c) to monitor the future operating state of the application environment.

9. The tangible computer readable storage medium according to claim 8 wherein the step of estimating a future time-varying status includes:
   obtaining the time-varying component from the current status of the characteristic;
   determining a time-varying periodic model from the time-varying component; and
   extrapolating the future time-varying status from the time-varying periodic model based on periodicity of the time-varying periodic model.

10. The tangible computer readable storage medium according to claim 8 wherein the step of estimating a future time stationary status includes:
    extracting the time-varying component from the current status of the characteristic to obtain the time stationary component of the current status;
    determining a time stationary periodic model from the time stationary component; and
    extrapolating the future time stationary status from the time stationary periodic model based on periodicity of the time stationary periodic model.

11. The tangible computer readable storage medium according to claim 8 wherein the operating state of the computing resource includes the characteristic representing a current demand for the computing resource, and a current performance state for the computing resource given the current demand and wherein the future operating state of the application environment includes a future demand for the application environment based on a future demand for the computing resource and a future performance state for the application environment given the future demand for the application environment and wherein the future performance state from the future operating state of the application environment is used to determine the difference.

12. The tangible computer readable storage medium according to claim 8 wherein step (c) includes:
    creating a plurality of sets of changes to the application environment, each of the plurality of sets of changes resulting in a reduction of the difference;
    assessing each of the plurality of sets of changes to determine a quantitative preference for the effect on the future operating state of the application environment of each of the plurality of sets of changes based a property of the effect; determining the selected set of changes from the plurality of sets of changes based on the quantitative preference; and
    effecting the selected set of changes on the application environment.

13. The tangible computer readable storage medium according to claim 12 wherein the step of assessing includes:
    determining a quantitative assessment of the effect on the future operating state of the application environment of a set of changes from the plurality of sets of changes for each of a plurality of properties wherein the plurality of properties includes the reduction of the difference and use of computing resources;
    combining the quantitative assessment from each of the plurality of properties for the set of changes to form the quantitative preference for the set of changes; and
    repeating the steps of determining a quantitative assessment and combining the quantitative assessment for each of the plurality of sets of changes.

14. The tangible computer readable storage medium according to claim 8 wherein the step of effecting includes:
    forming a workflow for each change in the selected set of changes; and
    performing the workflow for each change in the selected set of changes to invoke the selected set of changes.

15. The tangible computer readable storage medium according to claim 14 wherein the step of forming a workflow includes:
    decomposing each change in the selected set of changes into a set of steps that can be performed to invoke each change;
    forming the workflow from the set of steps for each change in the selected set of changes.

16. The tangible computer readable storage medium according to claim 8 wherein each change in the selected set of changes to the application environment is one of adding a new computing resource to the application environment, removing the computing resource from the application environment or reconfiguring the computing resource in the application environment.

17. The tangible computer readable storage medium according to claim 8 wherein step (d) includes:

repeating steps (a) to (c) when a change in the current status of the characteristic of the computing resource is detected.

18. The tangible computer readable storage medium according to claim 8 wherein step (d) includes:

repeating steps (a) to (c) at a repeating time interval.

* * * * *